United States Patent [19]

Khouri et al.

[11] Patent Number: 5,247,006

[45] Date of Patent: Sep. 21, 1993

[54] POLYPHENYLENE ETHER-GRAFT-ORTHOESTER COPOLYMER BLENDS AND METHOD OF PREPARATION

[75] Inventors: Farid F. Khouri, Clifton Park, N.Y.; Robert J. Halley, Atlanta, Ga.; John B. Yates, III, Glenmont, N.Y.

[73] Assignee: General Electric Company, Schenectady, N.Y.

[21] Appl. No.: 863,624

[22] Filed: Apr. 3, 1992

[51] Int. Cl.$^5$ .............. C08F 283/08; C08G 65/48; C08L 53/02; C08L 67/02; C08L 71/12; C08L 77/00
[52] U.S. Cl. .............. 524/508; 524/537; 524/539; 525/68; 525/92; 525/391; 525/397; 525/905
[58] Field of Search .............. 525/92, 68, 391, 397, 525/905; 524/508, 537, 539

[56] References Cited

U.S. PATENT DOCUMENTS

| | | | |
|---|---|---|---|
| 4,048,143 | 9/1977 | Hay et al. | 525/390 |
| 4,456,736 | 6/1984 | Miyashita et al. | 525/392 |
| 4,994,525 | 2/1991 | Brown et al. | 525/66 |
| 5,115,042 | 5/1992 | Khouri et al. | 525/397 |
| 5,115,044 | 5/1992 | Neugebauer | 525/392 |
| 5,132,361 | 7/1992 | Shea et al. | 525/66 |
| 5,132,373 | 7/1992 | Khouri et al. | 525/390 |
| 5,153,290 | 10/1992 | Khouri et al. | 526/266 |
| 5,162,448 | 11/1992 | Khouri et al. | 525/390 |

*Primary Examiner*—James J. Seidleck
*Assistant Examiner*—Thomas Hamilton, III
*Attorney, Agent, or Firm*—William H. Pittman

[57] ABSTRACT

A method for blending functionalized polyphenylene ethers made with graftable orthoester moieties, preferably the orthoester is 4-acryloyloxymethyl-2-methoxy-2-methyl-1,3-dioxolane monomer, with nucleophilic polymers, preferably polyesters, polyamides, or functionalized polyolefins. The preferred method for blending is by a one-step process, in which all reactions occur in one pass.

20 Claims, No Drawings

POLYPHENYLENE ETHER-GRAFT-ORTHOESTER COPOLYMER BLENDS AND METHOD OF PREPARATION

BACKGROUND OF THE INVENTION

This invention relates to a method for blending orthoester functionalized polyphenylene ethers (PPE-g-OE) with nucleophilic polymers. The functionalized polyphenylene ethers contain grafted ethylenically unsaturated orthoester groups.

Orthoester bearing chlorotriazines have been used as capping agents for solution capping of polyphenylene ethers. The orthoester end-capped polyphenylene ethers are known to be effective compatibilizers of polyphenylene ether (PPE)/polyester blends. The method of the present invention allows the use of novel polyphenylene ethers bearing grafted orthoester groups in blends with nucleophilic polymers. Further, the method of this invention eliminates the need for solution chemistry thereby reducing the intermediate steps resulting in a more efficient process and eliminating the risk of environmentally unsound solvent usage.

The synthesis of various graftable and copolymerizable monomers bearing orthoester functionality and their use in the synthesis of the orthoester-functionalized polyolefins by melt grafting have been previously described. Reference is made, for example, to Ser. No. 07/645,179 now U.S. Pat. No. 5,171,866 and Ser. No. 7/716,157 now 5,153,290. The current invention produces novel blends of functionalized polyphenylene ethers with polyesters, polyamides or functionalized polyolefins and preferably these novel functionalized polyphenylene ether blends are produced in an in situ, all melt process.

BRIEF DESCRIPTION OF THE INVENTION

This invention relates to a method for forming polyphenylene ether-graft-orthoester (PPE-g-OE) copolymer blends comprising the step of blending functionalized polyphenylene ether, which is the reaction product of a polyphenylene ether and an ethylenically unsaturated orthoester graftable monomer, with a nucleophilic polymer. The orthoester is a compound in which one carbon atom is attached to another by a direct carbon/carbon bond, and there are three additional carbon atoms attached through oxygen. Such compounds can be considered to be esters of the hypothetical ortho acids R-C(OH)$_3$, wherein R is an organic radical. Further, this invention relates to the use of functionalized PPE in blends with polyester, polyamides, or functionalized polyolefins in a one-step and preferably in an all melt process.

DETAILED DESCRIPTION OF THE INVENTION

The polyphenylene ethers employed in the method of this invention are known polymers comprising a plurality of structural units of the formula

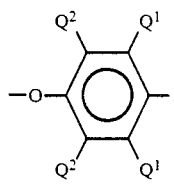

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least 2 carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer polyphenylene ethers are included. The preferred homopolymers are those containing 2,6-dimethyl-1,4-phenylene ether units. Suitable copolymers include random copolymers containing such units in combination with (for example) 2,3,6-trimethyl-1,4-phenylene ether units. Also included are polyphenylene ethers containing moieties prepared by grafting onto the polyphenylene ether in a known manner such materials as vinyl monomers or polymers such as polystyrenes and elastomers, as well as coupled polyphenylene ethers in which coupling agents such as low molecular weight polycarbonates, quinones, heterocycles and formals undergo reaction in a known manner with the hydroxy groups of two polyphenylene ether chains to produce a higher molecular weight polymer, provided a substantial proportion of free OH groups remains.

The polyphenylene ether generally has a number average molecular weight within the range of about 3,000–40,000 and a weight average molecular weight within the range of about 20,000 to about 80,000 as determined by gel permeation chromotography. Its intrinsic viscosity is most often in the range of about 0.15–0.6 dl./g, as measured in chloroform at 25° C.

The polyphenylene ethers are typically prepared by the oxidative coupling of at least one monohydroxy aromatic compound such as 2,6-xylenol or 2,3,6-trimethylphenol. Catalyst systems are generally employed for such couplings; they typically contain at least one heavy metal compound such as a copper, manganese, or cobalt compound, usually in combination with various other materials.

It will be apparent to those skilled in the art from the foregoing that the polyphenylene ethers contemplated for use in the method of the present invention include all those presently known, irrespective of variations in structural units or ancillary chemical features.

The following are illustrative ethylenically unsaturated orthoester monomers which may be used in the current invention:

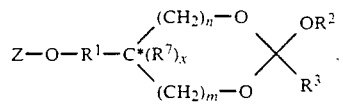

$R^1$ is a $C_{1-6}$ alkylene radical; $R^2$ is a $C_{1-4}$ primary or secondary alkyl radical or is an alkylene radical forming a second 5- or 6-membered ring with C*; $R^3$ is a $C_{1-4}$ primary or secondary alkyl or $C_{6-10}$ aromatic radical or $R^2$ and $R^3$ together with the atoms connecting them form a 5-,6- or 7-membered ring; x is 0 when $R^2$ and C* form a ring and is otherwise 1; $R^7$ is hydrogen or $C_{1-4}$ primary or secondary alkyl. Z is following formula:

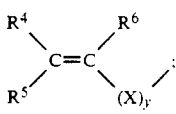

$R^4$, $R^5$, and $R^6$ may be the same or different and may be hydrogen; or a $C_{1-8}$ alkyl radical, or substituted derivatives thereof; or an aryl radical, or substituted derivatives thereof. The value of y may be 1 or greater.

In the above formula $R^1$ is a $C_{1-6}$ alkylene radical such as methylene, ethylene, propylene, trimethylene, pentamethylene, or hexamethylene. Methylene is preferred.

The $R^2$ radical may be a $C_{1-4}$ primary or secondary alkyl radical such as methyl, ethyl, n-propyl, isopropyl, n-butyl, isobutyl, or secondary butyl. Primary radicals and especially the methyl radical are generally preferred. The $R^3$ may be a $C_{1-4}$ primary or secondary alkyl radical as defined above for $R^2$, Or a $C_{6-10}$ aromatic (preferably aromatic hydrocarbon) radical. Finally, it is possible for $R^2$ and $R^3$ together to form a 5-,6- or 7-membered ring with the atoms connecting them. Thus, certain spiro orthoester-functionalized polyphenylene ethers are also encompassed by this formula.

The values of m and n depend on whether the cyclic orthoester moiety is a 5-membered or 6-membered ring. In general, 5-membered rings are preferred; that is, m is 0 and n is 1. However, compositions in which a 6-membered ring is present, which requires either that m and n both be one or that m be 0 and n be 2 may also be used.

Z represents groups that are joined to the orthoester moiety through the oxygen bond shown in the above formula. $R^4$-$R^6$ in the above formula may contain any substituent known to the art provided such substituent is inert to orthoester groups. By the term inert is meant a low probability or no probability of the substituent entering into a reaction with the orthoester moieties in any appreciable amounts. X can be

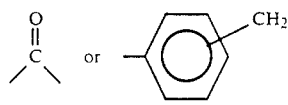

or —$CH_2$—.

Illustrative of the types of monomers which may be employed in generating the PPE-g-OE, are acrylate, methacrylate, cinnamate, cinnamyl, allyl, and vinylbenzyl substituted orthoesters. Such compounds may be prepared according to the procedures discussed in Ser. No. 07/645,179 now U.S. Pat. No. 5,171,866.

The preparation of several of the orthoesters is illustrated by the following examples. Molecular structures of all products in Examples A–D were confirmed by proton and carbon-13 nuclear magnetic resonance spectroscopy.

EXAMPLE A

A 5-liter 3-necked flask fitted with a mechanical stirrer, pressure equalizing addition funnel and nitrogen inlet was charged with 301 grams (2.03 moles) of 4-hydroxymethyl-2-methoxy-2-methyl-1,3-dioxolane, 514 grams (5.08 moles) of triethylamine and 2 liters of methylene chloride. The flask was immersed in an ice-water bath and 193.1 grams (2.13 moles) of acryloyl chloride was added over 50 minutes under nitrogen, with stirring. The mixture was stirred at room temperature overnight and the filtrate was washed twice with 2-liter portions of water, dried over magnesium sulfate, filtered and vacuum stripped. A free radical inhibitor, 3-t-butyl-4-hydroxy-5-methylphenyl sulfide, was added in the amount of 200 ppm. to the residue which was then distilled under vacuum. The desired 4-acryloyloxymethyl-2-methoxy-2-methyl-1,3-dioxolane distilled at 80°–85° C./0.5–1.0 torr.

EXAMPLE B

The procedure of Example A was repeated, employing 281 grams (1.9 moles) of 4-hydroxymethyl-2-methoxy-2-methyl-1,3-dioxolane, 481 grams (4.76 moles) of triethylamine and 199 grams (1.9 moles) of methacryloyl chloride. The product, 4-methacryloxymethyl-2-methoxy-2-methyl-1,3-dioxolane, was collected at 80° C./0.4 torr.

EXAMPLE C

The procedure of Example A was repeated, employing 21 grams (100 mmol.) of 4-hydroxymethyl-2-methoxy-2-phenyl-1,3-dioxolane, 25.3 grams (250 mmol.) of triethylamine, 9.5 grams (105 mmol.) of acryloyl chloride and 150 ml. of methylene chloride. The crude product was purified by column chromatography over basic alumina, using 15% (by volume) ethyl acetate in hexane as an eluant, to yield the desired 4-acryloyloxymethyl-2-methoxy-2-phenyl-1,3-dioxolane.

EXAMPLE D

A 4-necked 250-ml. round-bottomed flask equipped with a mechanical stirrer, a pressure equalizing addition funnel, a condenser and a thermometer was charged with 51.9 grams (350 ml.) of 4-hydroxymethyl-2-methoxy-2-methyl-1,3-dioxolane and 14.01 grams (350 mmol.) of powdered sodium hydroxide. The slurry was stirred for 15 minutes under nitrogen, after which 41.1 grams (270 mmol.) of vinylbenzyl chloride (isomeric mixture) was added dropwise over 10 minutes. The mixture was heated to 80° C., whereupon an exothermic reaction took place which caused the temperature to rise to 140° C. The mixture was stirred overnight under nitrogen, diluted with 400 ml. of methylene chloride and 5 ml. of triethylamine and washed twice with 250 ml. of aqueous sodium chloride solution. The organic layer was dried over magnesium sulfate, filtered and vacuum stripped, and the residue was purified by column chromatography over basic alumina using a 2:1 (by volume) mixture of hexane and methylene chloride as eluant. There was obtained the desired isomeric mixture of 4-(2-methoxy-2-methyl-1,3-dioxolanyl)methyl vinylbenzyl ethers.

Also employed in preparing the PPE-g-OE are optional ingredients including initiators, impact modifiers and lubricants.

The proportions of orthoester monomer and polyphenylene ether may be varied widely, depending upon the proportion of grafted groups desired in the PPE-g-OE formed. The weight ratios of orthoester graftable monomer to PPE are typically in the range of about 0.05 to 10.0 and preferably in the range of from about 0.50 to 3.0.

Suitable initiators for use in preparing the PPE-g-OE include free radical initiators generally known to the art. Specific initiators include various peroxides and hydroperoxides. Specific examples include benzoyl peroxide, dicumyl peroxide, 2,5-dimethyl-2,5-di(t-butyl-peroxy)hexyne-3, and cumene hydroperoxide, with 2,5-dimethyl-2,5-di(t-butylperoxy)hexyne-3 being preferred. The amount of initiator being used can vary from 0 weight percent to about 0.5 weight percent relative to PPE.

The PPE-g-OE may be mixed with other polymers such as polyesters, polyamides, or functionalized polyolefins to form copolymer-containing blends according to this invention. These blends, may also be formulated in a "one step" process, in which the PPE, graftable OE, other polymer optional initiator, and impact modifier are all reacted in one continuous process. This process generally results in significant levels of PPE bound to the polyester, polyamide, or functionalized polyolefin and results in the highly ductile materials. The preferred polyesters are poly(ethylene terephthalate), and poly(butylene terephthalate), generally having a number average molecular weight in the range of about 20,000-70,000, as determined by intrinsic viscosity (I.V.) at 30° C. in a mixture of 60% (by weight) phenol and 40% 1,1,2,2-tetrachloroethane.

Impact modifiers for polyphenylene ether compositions include natural and synthetic elastomeric polymers, typically derived from such monomers as olefins (e.g., ethylene, propylene, 1-butene and 4-methyl-1-pentene), alkenylaromatic monomers (e.g., styrene and α-methylstyrene), conjugated dienes (e.g., butadiene, isoprene and chloroprene), and vinylic carboxylic acids and their derivatives (e.g., vinyl acetate, acrylic acid, alkylacrylic acids, ethyl acrylate, methyl methacrylate and acrylonitrile). They include homopolymers and random, block, radial block, graft and core-shell copolymers as well as combinations thereof.

Suitable olefin homopolymers include low density, linear low density and high density polyethylene, isotactic polypropylene and the like. Conjugated diene polymers include homopolymers and random copolymers such as polybutadiene, butadiene-styrene copolymers, isoprene-isobutene copolymers, chlorobutadiene polymers, butadiene-acrylonitrile copolymers and polyisoprene. Ethylene-propylene-diene monomer rubbers, comprising predominantly ethylene units, a moderate proportion of propylene units and up to about 20 mole percent of non-conjugated diene monomer units, are also suitable.

A particularly useful class of impact modifiers comprises the AB (diblock) and ABA (triblock) copolymers and core-shell graft copolymers of alkenylaromatic and diene compounds, especially those comprising styrene and butadiene or isoprene blocks. The conjugated diene blocks may be partially or entirely hydrogenated, whereupon they may be represented as ethylene-propylene blocks or the like and have properties similar to those of olefin block copolymers. Examples of triblock copolymers of this type are polystyrene-polybutadiene-polystyrene (SBS), hydrogenated polystyrene-polybutadiene-polystyrene (SEBS), polystyrene-polyisoprene-polystyrene (SIS), poly(αmethylstyrene)-polybutadiene-poly(α-methylstyrene) and poly(α-methylstyrene)-polyisoprene-poly(α-methylstyrene). Particularly preferred triblock copolymers are available commercially as CARIFLEX ®, KRATON D ® and KRATON G ® from Shell.

Also suitable as impact modifiers are the ionomer resins, which may be wholly or partially neutralized with metal ions, and the core-shell type graft copolymers. In general, the latter have a predominantly conjugated diene or crosslinked acrylate rubbery core and one or more shells polymerized thereon and derived from monoalkenylaromatic and/or acrylic monomers alone or in combination with other vinyl monomers. Included are copolymers wherein an interpenetrating network of the resins employed characterizes the interface between the core and shell, such as those available from General Electric Company and described in U.S. Pat. No. 3,944,631.

Other impact modifiers include the above-described types containing units having polar groups or active functional groups, as well as miscellaneous polymers such as THIOKOL ® rubber, polysulfide rubber, polyurethane rubber, polyether rubber (e.g., polypropylene oxide), epichlorohydrin rubber, ethylene-propylene rubber, thermoplastic polyester elastomers and thermoplastic ether-ester elastomers.

The amount of impact modifier used is not critical and can vary from about 0 to about 25 parts per 100 parts of polyphenylene ether.

Suitable lubricants for the current invention include those generally known to the art. Typical lubricants generally include polyalphaolephins, fatty amides, aluminum methylphosphonate (AMMP), and fluoroadditives. Generally, any lubricant that does not react with the mix. Specific examples of polyalphaolefins include saturated alphaolefins fluids with kinematic viscosity of approximately 2 to about 20 centistokes and preferably 8 to 12 centistokes at 100° C. as determined by ASTM D445. Such fluids are commercially available from Henkel and are known as EMERY 3002 ®, EMERY 3004 ®, EMERY 3006 ®, and the like. Alternatively the synfluids manufactured by Gulf Oil Corporation are also useful. The amount of hydrogenated alpha-olefin fluid comprises from approximately 0.05 to about 5 weight percent of the total composition.

The fatty acid amide generally has at least one fatty acid having from about 4 to about 22 carbon atoms. Commercially available fatty acid amides are often formed from a mixture of fatty acids, and such fatty acid amide mixtures are also suitable for use in the present compositions. Specific examples include stearamide, arachidamide, behenamide, oleamide, erucamide, stearyl erucamide, erucyl erucamide, oleyl palmitamide, stearyl stearamide, and erucyl stearamide. The preferred fatty acid is oleyl palmitamide.

The aluminum salt lubricants that may be used in the current invention include aluminum methyl methylphosphonate (AMMP) and aluminum methylethylphosphonate. The amount of lubricant can generally vary from about 0 to about 0.8 percent by weight. Particularly useful are those compounds that are low melting solids or oils that do not appreciably react with the grafting functionality and do not result in degradation of any of the polymers present in the blend.

The copolymer-containing blends formed with the PPE-g-OE may also contain conventional ingredients such as fillers, flame retardants, pigments, dyes, stabilizers, anti-static agents, crystallization aids, mold release agents and the like, as well as resinous components not previously discussed.

In order for the PPE-g-OE to form, the graftable monomer must be in contact with the PPE for an effective amount of time to allow this formation to occur. This residence time is generally from about 0.01 to about 10 minutes and preferably about 0.5 to about 2 minutes. The grafting temperature also plays a role in allowing the formation of PPE-g-OE. The grafting temperature is generally in the range of 250°–350° C. Table I demonstrates the effect of increasing grafting temperature on polyester/PPE-g-OE blend properties.

The PPE-g-OE and the blends formed from these PPE-g-OE's are generally gel free. By gel free it is meant that substantially all of PPE-g-OE is extractable with chloroform or toluene without leaving any insoluble material. The present invention affords functionalized polymers with a gel content no greater than 5%.

Polyesters suitable for preparing the copolymer-containing compositions made from the PPE-g-OE include those comprising structural units of the formula

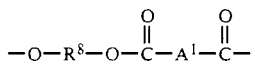

wherein each $R^8$ is independently a divalent aliphatic, alicyclic or aromatic hydrocarbon or polyoxyalkylene radical and $A^1$ is a divalent aromatic radical. Such polyesters include thermoplastic polyesters illustrated by poly(alkylene dicarboxylates), elastomeric polyesters, polyarylates, and polyester copolymers such as copolyestercarbonates. Because the principal reaction which occurs with the orthoester groups in the capped polyphenylene ether involves a carboxylic acid group of the polyester, it is highly preferred that said polyester have a relatively high carboxylic end group concentration. Concentrations in the range of about 5–250 microequivalents per gram are generally suitable, with 10–100 microequivalents per gram being preferable, 30–100 being more preferable and 40–80 being particularly desirable.

The polyester may include structural units of the formula

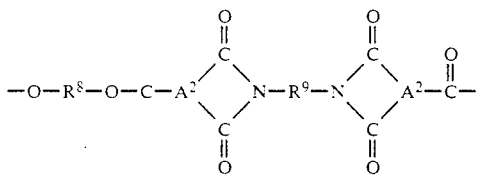

wherein $R^8$ is as previously defined, $R^9$ is a polyoxyalkylene radical and $A^2$ is a trivalent aromatic radical. The $A^1$ radical in the above formula is most often p- or m-phenylene or a mixture thereof, and $A^2$ is usually derived from trimellitic acid and has the structure

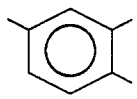

The $R^8$ radical may be, for example, a $C_{2-10}$ alkylene radical, a $C_{6-10}$ alicyclic radical, a $C_{6-20}$ aromatic radical or a polyoxyalkylene radical in which the alkylene groups contain about 2–6 and most often 4 carbon atoms. As previously noted, this class of polyesters includes the poly(alkylene terephthalates) and the polyarylates. Poly(alkylene terephthalates) are frequently preferred, with poly(ethylene terephthalate) and poly(butylene terephthalate) being most preferred.

The polyester generally has a number average molecular weight in the range of about 20,000–70,000, as determined by intrinsic viscosity (I.V.) at 30° C. in a mixture of 60% (by weight) phenol and 40% 1,1,2,2-tetrachloroethane.

Polyamides may also be employed for the formation of copolymer-containing compositions. Included are those prepared by the polymerization of a monoaminomonocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as proportions of a diamine and a dicarboxylic acid. (The term "substantially equimolar" proportions includes both strictly equimolar proportions and slight departures therefrom which are involved in conventional techniques for stabilizing the viscosity of the resultant polyamides.) The dicarboxylic acid may be used in the form of a functional derivative thereof, for example, an ester or acid chloride.

Examples of the aforementioned monoaminomonocarboxylic acids or lactams thereof which are useful in preparing the polyamides include those compounds containing from 2 to 16 carbon atoms between the amino and carboxylic acid groups, said carbon atoms forming a ring containing the —CO—NH— group in the case of a lactam. As particular examples of a monocarboxylic acids and lactams there may be mentioned ε-aminocaproic acid, butyrolactam, pivalolactam, ε-caprolactam, capryllactam, enentholactam, undecanolactam, dodecanolactam and 3- and 4- aminobenzoic acids.

Diamines suitable for use in the preparation of the polyamides include the straight chain and branched chain alkyl, aryl and alkaryl diamines. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the following formula $$HOOC-Y-COOH$$

wherein Y is a divalent aliphatic or aromatic group containing at least 2 carbon atoms. Examples of aliphatic acids are sebacic acid, octadecanedioic acid, suberic acid, glutaric acid, pimelic acid and adipic acid.

Both crystalline and amorphous polyamides may be employed, with the crystalline species often being preferred by reason of their solvent resistance. Typical examples of the polyamides or nylons, as these are often called, include, for example, polyamide-6 (polycaprolactam), 66 (polyhexamethylene adipamide), 11, 12, 63, 64, 6/10 and 6/12 as well as polyamides from terephthalic acid and/or isophthalic acid and trimethylhexamethylenediamine; from adipic acid and m-xylylenediamines; from adipic acid, azelaic acid and 2,2-bis(p-amonophenyl)propane or 2,2-bis-(p-amonocyclohexyl)propane and from terephthalic acid and 4,4' diaminodicyclohexylmethane. Mixtures and/or copolymers of two or more of the foregoing polyamides or prepolymers thereof, respectively, are also within the scope of the present invention. Preferred polyamides are polyamide-6, 46, 66, 11 and 12, most preferably polyamide-66.

The olefin polymers (hereinafter sometimes designated "polyolefins") which may be functionalized for use in the preparation of copolymer-containing compositions of this invention are homopolymers and copolymers of known aliphatic olefins including ethylene, propylene, 1-butene, 2-butene, 1-pentene, 2-pentene, 2-methyl-1-pentene, 3-methyl-1-pentene, 1-octene and 1-dodecene. The $C_{2-6}$ olefins are preferred, with ethylene and propylene being most preferred.

For copolymer formation, it is essential for the polyolefin to have the aforementioned carboxylic acid substituents. They may be incorporated in the polyolefin by employing suitable functional comonomers, such as acrylic acid or maleic anhydride, in the formation thereof. They may also be provided by graft polymerization on an already prepared polyolefin, using the same monomers, or by other art-recognized means of functionalization. Any of the commercially available graft-functionalized polyolefins may be used, or suitable polymers may be prepared from commercially available unfunctionalized polyolefins such as low density polyethylene, high density polyethylene and polypropylene.

It is highly preferred to employ a blending method which results in the formation of an intimate blend for the preparation of the copolymer-containing compositions using the novel PPE-g-OE of this invention. Suitable methods include solution blending, although such procedures are of limited applicability to many polymers (especially polyesters) by reason of their insolubility in most common solvents. For this reason and because of the availability of melt blending equipment in commercial polymer processing facilities, melt reaction procedures are generally preferred. Conventional melt blending procedures and equipment may be employed, with extrusion often preferred because of its relative convenience and particular suitability. Typical reaction temperatures are in the range of about 175°–350° C. It is usually preferred to extrude with vacuum venting as described hereinabove with reference to uncapped polyphenylene ether, particularly if vacuum venting was not previously employed in the preparation or processing of said polyphenylene ether.

Those skilled in the art will be familiar with blending methods and apparatus capable of intimately blending resinous constituents, especially by kneading. They are exemplified by disc-pack processors and various types of extrusion equipment. Illustrations of the latter are continuous mixers; single screw kneading extruders; corotating, intermeshing and counterrotating, non-intermeshing twin screw extruders having such features as staggered configuration screws, forward-flighted compounders, cylindrical bushings and left-handed screw elements; and extruders having screws which include at least one and preferably two kneading block elements.

One method for preparing copolymers of polyphenylene ethers with polyester, polyamides and the like is disclosed in copending, commonly owned application serial number 07/351,905 now U.S. Pat. No. 5,096,979.

This method comprises capping the polyphenylene ether by reaction with an epoxychlorotriazine. Such capped polyphenylene ethers readily form copolymers with nucleophilic polymers such as polyesters, polyamides and functionalized olefin polymers, and blends containing such copolymers have numerous desirable properties including high impact and tensile strengths and structural integrity.

However, the use of epoxychlorotriazines as capping agents have certain disadvantages. Among these are the necessity of using compounds such as glycidol in the preparation of the epoxychlorotriazines. Glycidol is expensive, and also has carcinogenic properties. Interest continues, therefore, in the development of new reagents capable of forming polyphenylene ethers which are reactive with other polymers.

The present invention is illustrated by the following examples. All percentages are by weight. Reagent percentages are based on the amount of polyphenylene ether.

EXAMPLE 1

A number of experiments were run to determine the effect of loading of

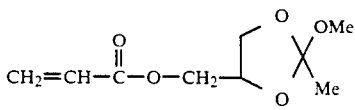

4-acryloyloxymethyl-2-methoxy-2-methyl-1,3-dioxolane monomer on impact strength of blends of PPE-g-OE and polyester. The PPE used was 2,6-dimethyl-1,4-polyphenylene ether having 0.41 intrinsic viscosity (I.V.), and added in an amount of 250g. Acrylate orthoester (AOE) of the above formula was added in various amounts. The blends used 0.2 weight percent 2,5-Dimethyl-2,5-di(t-butylperoxy)hexyne-3 as initiator and 3 weight percent of a polyalphaolefin provided by Henkel Co. with the tradename EMERY 3008 ® as lubricant.

The weight percent loading of the OE was based on the weight percent of the total PPE. The PPE was obtained from GE Plastics.

The Notched Izod Impact Strength test (NI) was performed according to ASTM D-648. The Tensile test was performed according to ASTM D-638. The Dynatup test was performed according to D-3763-83.

The PPE (0.41 I.V.,250 g), lubricant (7.5g) initiator (0.5 g) and the orthoester in the desired amounts (see Table 2) were dry blended to produce a fine powder. This mixture was fed through a Welding Engineers 20 mm twin screw, non-intermeshing counter rotating extruder. The screw speed was 360 rpm, and the feed rate was maintained to keep the torque reading between 5–6 amp. Barrel temperatures were as follows: zone 1 equals 250° F. (121° C.); zone 2 equals 375° F. (191° C.); zones 3–6 and the die temperature was 510°–570° F. (266°–299° C.). The extrudate formed was collected, pelletized, and dried at 110° C. for 3 hours. The pellets were blended with polybutylene terephthalate (PBT) having a number average molecular weight of about 50,000 as determined by gel permeation chromatography and KG-1651 ® an SBS triblock copolymer with polystyrene end blocks having weight average molecular weights of 29,000 and a hydrogenated butadiene midblock having a weight average molecular of 116,000 from Shell Oil in the ratio of PPE-g-OE/PBT/impact modifier 1/2/0.33. The resulting extrudate was pelletized and dried at 120° C. for 2 hours. The pellets were molded into izod bars and tensile bars on a Boy 15T injection molder. The barrel temperature equals 280° C., the mold temperature equals 60° C., and injection pressure was 1000 psi. The results were set forth in Table 1.

It can be seen from Table I that the grafting temperature must be maintained at a high enough temperature for grafting to occur, but a low enough temperature to insure intact orthoester functionality on the PPE. A proposed mechanism is a thermal or free radical reaction occurs between the PPE and the graftable monomer.

The data from entries 1-5 demonstrates loadings as low as 1 weight percent AOE can be used to prepare ductile parts. Increasing the grafting temperature above about 550° F. (288° C.) decreases the physical properties of the final blend.

ple 1, and initiator as in Example 1 with the specific orthoester monomer set forth in Table II, were dry blended to produce a fine-sized powder. The grafting extrusions were done on a Welding Engineers 20mm twin screw, non-intermeshing counter rotating extruder. The screw speed was 360 rpm, and the feed rate was maintained to keep the torque reading between 5-6 AMp. Barrell temperatures were as follows, Zone 1: 250° F. (121° C.), Zone 2: 375° F. (191° C.), Zone 3-6 and die temperatures: 510°-570° F. (266°-299° C.) The extrudate was collected, pelletized and dried at 110° C. for 3 hours. The PPE-g-OE pellets were blended with polybutylene terephthalate (PBT) having a number average molecular weight of about 50,000 as determined by gel permeation chromatography, and impact modifier (KG-1651 ®) from Shell Oil Company, an SBS

TABLE I

Data of Impact Modified Blends PPE-g-OE*/Polybutylene Terephthalate

| | | GRAFTING TEMP | | PPE-g-OE/PBT Blends | | | |
|---|---|---|---|---|---|---|---|
| | LOADING | | | NOTCHED IZOD (N.I.) | | STANDARD DEVIATION (S.D.) | |
| SAMPLE | (WT %)** | (°F.) | (°C.) | (ft.-lbs/in.) | J/M | (ft.-lbs/in.) | J/M |
| 1 | 0.76 | 510 | 266 | 3.43 | 0.0643 | 0.3 | 0.006 |
| 2 | 1.00 | 510 | 266 | 11.82 | 0.2214 | 0.2 | 0.004 |
| 3 | 1.00 | 550 | 288 | 13.1 | 0.2454 | 0.45 | 0.008 |
| 4 | 1.28 | 510 | 266 | 12.36 | 0.2316 | 0.5 | 0.009 |
| 5 | 1.5 | 510 | 266 | 14.7 | 0.2754 | 0.4 | 0.008 |
| 6 | 1.5 | 550 | 288 | 13.7 | 0.2567 | 0.3 | 0.006 |
| 7 | 1.64 | 510 | 266 | 11.62 | 0.2177 | 0.4 | 0.008 |
| 8 | 2.56 | 510 | 266 | 10.10 | 0.1892 | 0.5 | 0.009 |
| 9 | 2.56 | 530 | 277 | 11.49 | 0.2153 | 0.3 | 0.006 |
| 10 | 2.56 | 550 | 288 | 10.04 | 0.1881 | 0.3 | 0.006 |
| 11 | 2.56 | 570 | 299 | 5.11 | 0.0957 | 1.7 | 0.200 |

*The PPE-g-OE is produced from the acrylate orthoester monomer
**WT % = (wt. monomer/wt. PPE) × 100%

EXAMPLE 2

Various orthoester monomers were used to form PPE-g-OE using the conditions set forth below. Table II lists the amounts and type of monomers used. Table II also lists the impact data from the monomers showing the improved impact properties of the final PPE-g-OE/PBT impact modified blends.

The grafting temperature was 510° F.(266° C.). PPE (0.41 I.V., 250 g, as in Example 1), lubricant as in Example triblock copolymer, in the ratio of 1/2/0.33. This blend was then extruded on a Welding Engineers 20 mm twin screw, non intermeshing counter rotating extruder. The screw speed was 400 rpm, and the feed rate was maintained to keep the torque reading between 5-6 Amp. The extrudate was pelletized and dried at 120° C. for 2 hours. The pellets were molded into izod bars and tensile bars on a Boy 15T injection molder, with a barrel temperature of 280° C., a mold temperature of 60° C., and injection pressure of 1000 psi.

TABLE II

Impact Data of Impact Modified PPE-g-OE/PBT Blends

| | LOADING | | N.I. | | S.D. | |
|---|---|---|---|---|---|---|
| MONOMER | (WT %)$^a$ | (MOL. %)$^b$ | (ft.-lbs./in.) | J/M | (ft.-lbs./in.) | J/M |
| 1 | 2.56 | 1.27 | 10.10 | 0.1892 | 0.5 | 0.009 |
| 2 | 2.72 | 1.26 | 8.10 | 0.1517 | 0.3 | 0.006 |
| 3 | 2.40 | 1.27 | 2.32 | 0.0435 | 0.3 | 0.006 |
| 3 | 3.60 | 1.91 | 11.2 | 0.2098 | 0.5 | 0.009 |
| 4 | 2.80 | 1.06 | 2.26 | 0.0423 | 0.2 | 0.004 |
| 4 | 4.08 | 1.54 | 6.03 | 0.1130 | 2.2 | 0.040 |
| 5 | 3.36 | 1.21 | 2.64 | 0.0495 | 0.3 | 0.006 |

$^a$wt. % = (wt. monomer/wt. % PPE) × 100%
$^b$mol. % = (mol. monomer/wt. % PPE) × 100%

Monomer

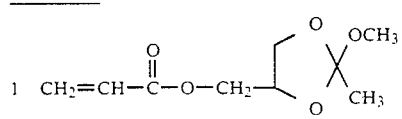

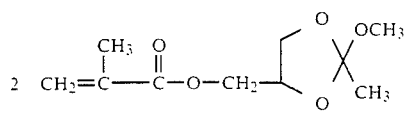

TABLE II-continued

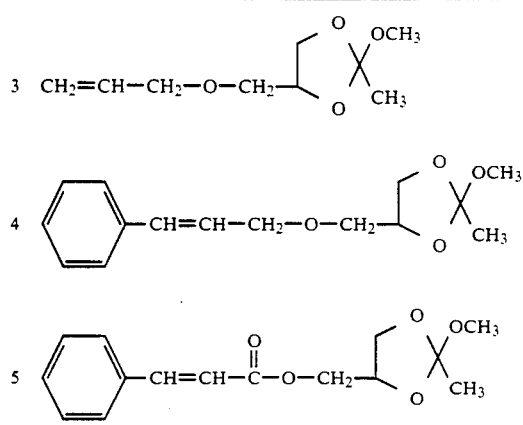

5,247,006

EXAMPLE 3

This Example shows the effect of various radical initiators when used in the PPE-g-OE/PBT blend 1 made from the acrylate orthoester of Example 2.

As shown in Table III, there is a small beneficial effect in using initiator, however, grafting can occur in the absence of initiator. One possible explanation is that enough grafting occurs due to the radical generation by the backbone thermal rearrangement of the PPE, however, this is just one proposed mechanism.

TABLE III

Effect of Initiator on Impact Modified PPO-g-OE/PBT Blends

| Grafting Blend # | Monomer Loading (wt %) | Initiator | Initiator Loading (wt %) | N.I. (ft-lbs/in) | N.I. J/M | S.D. (ft-lbs/in) | S.D. J/M |
|---|---|---|---|---|---|---|---|
| 1 | 1.68 | — | 0 | 11.2 | 0.2098 | 0.90 | 0.0169 |
| 2 | 1.5 | 2,5-Dimethyl-2,5-di(t-butylperoxy)hexyne-3 | 0.2 | 14.5 | 0.2716 | 0.35 | 0.007 |
| 3 | 1.5 | Benzoyl Peroxide | 0.2 | 12.5 | 0.2342 | 0.4 | 0.008 |
| 4 | 1.5 | Cumene Hydroperoxide | 0.2 | 14.1 | 0.2660 | 0.1 | 0.002 |
| 5 | 1.5 | Dicumyl Peroxide | 0.2 | 14.5 | 0.2716 | 0.4 | 0.008 |

EXAMPLE 4

This example shows the effect of lubricant level when used in the grafting step on PPE employing acrylate orthoester 1 of Example 2. Spectroscopic examination (Proton NMR) has shown a drop in active orthoester level (10–15%) when the lubricant loading is reduced while maintaining a constant acrylate orthoester loading. Table IV shows a slight improvement in notch izod measurement when lubricant level is increased.

TABLE IV

Effect of Lubricant Level on Impact Modified PPO-g-OE/PBT Blends

| Grafting Blend # | Monomer Loading (wt %) | Lubricant (wt %) | N.I. (ft-lbs/in) | N.I. J/M | S.D. (ft-lbs/in) | S.D. J/M |
|---|---|---|---|---|---|---|
| 1 | 1.68 | 0 | 10.4 | 0.1948 | 0.1 | 0.002 |
| 2 | 1.0 | 1.0 | 10.4 | 0.1948 | 0.5 | 0.009 |
| 3 | 1.0 | 2.0 | 11.9 | 0.2229 | 0.35 | 0.007 |
| 4 | 1.5 | 1.0 | 11.6 | 0.2173 | 0.6 | 0.011 |
| 5 | 1.5 | 2.0 | 12.8 | 0.2398 | 0.4 | 0.008 |

EXAMPLE 5

In an alternative embodiment blends of various compositions as listed in Table V were prepared using a downstream feed process. The PPE, lubricant and the orthoester monomer were blended as previously described in Example 1. In a separate container, PBT and FINAPRENE 401 ® (10% of the total blend), were blended as in Example 1 to obtain a uniform mix. The grafting extrusions were done on a Werner-Pfleiderer 30 mm co-rotating extruder equipped to allow for downstream feeding of materials. The PPE blend was fed into the extruder with the extruder throat temperatures set to 540° F. (282° C.) at 350 rpm. The melt was vacuum vented, and at a point downstream of the vacuum vent, the PBT /impact modifier blend (made as described in Example 2 using an unsaturated FINAPRENE 401 ® as the SBS impact modifier) was fed into the extruder. The downstream portion of the extruder was set to 510° F., and another vacuum vent was applied prior to the die. The extrudate was pelletized, dried and molded as described above. Table V shows the physical properties of the blends produced. The copolymer formation was confirmed by extraction with chloroform. AOE produced a ductile blend and is the preferred starting monomer. AOE produced a ductile blend and is the preferred starting monomer.

TABLE V

PPO-PBT blend compositions formed using a one-step extrusion process

| BLEND | PPE | AOE | Lubricant | Initiator | PBT | Impact Modifier |
|---|---|---|---|---|---|---|
| 1 | 100 | — | 3 | 0.1 | 200 | 33 |
| 2 | 100 | 1.66 | 3 | 0.1 | 200 | 33 |
| 3 | 100 | 1.66 | 3 | 0.2 | 200 | 33 |
| 4 | 100 | 1.66 | 6 | 0.1 | 200 | 33 |
| 5 | 100 | 2.55 | 3 | 0.15 | 200 | 33 |

TABLE VI

| | | Heat Distortion | | | Dynatup | | % |
|---|---|---|---|---|---|---|---|
| BLEND | N.I. | (HDT) (°F.) | (°C.) | % Elong. | 73° F. (23° C.) | −20° F. (−29° C.) | Copolymer* |
| 1 | 0.1 | 325 | 163 | 5.7 | 1B | 1B | 2.9 |
| 2 | 1.1 | 305 | 152 | 26 | 6B | 2B | 9.9 |
| 3 | 2.1 | 318 | 159 | 61 | 37D | 39B | 9.5 |
| 4 | 2.1 | 307 | 153 | 82 | 37D | 39B | 5.7 |
| 5 | 11.8 | 319 | 159 | 54 | 30D | 41D | 26.0 |

*% Copolymer refers to percent of PPE bound to PBT

What is claimed is:

1. A method for forming polyphenylene ether-graft-orthoester copolymer blends comprising the step of blending functionalized polyphenylene ether, which comprises the reaction product of a polyphenylene ether and an ethylenically unsaturated graftable orthoester monomer, with a nucleophilic polymer.

2. The method of claim 1 wherein said blend is formed at a temperature range of 175°–350° C.

3. The method as in claim 1 wherein said functionalized polyphenylene ether is made from 2,6-dimethyl-1,4-polyphenylene ether having an intrinsic viscoscity range of 0.15–0.6 dl/g as measured in chloroform at 25° C. and 4-acryloyloxymethyl-2-methoxy-2-methyl-1,3-dioxolane.

4. The method as in claim 2 wherein said nucleophilic polymer is selected from the group consisting of polyesters, polyamides, and functionalized polyolefins.

5. A one-step method for forming functionalized polyphenylene ether copolymer blends comprising the step of blending polyphenylene ether, an ethylenically unsaturated graftable orthoester monomer, and a nucleophilic polymer.

6. The method as in claim 5 wherein said nucleophilic polymer is polyethylene terephthalate or polybutylene terephthalate.

7. The method as in claim 6 wherein the blend further comprises a lubricant.

8. The method as in claim 6 wherein the blend further comprises a free radical initiator.

9. The method as in claim 6 wherein the blend further comprises an impact modifier.

10. The method of claim 7 wherein said lubricant is polyalphaolefin.

11. The method as in claim 8 wherein said free radical initiator is 2,5-dimethyl-2,5-di(t-butylperoxy)hexyne-3.

12. The method of claim 9 wherein said impact modifier is an SBS-rubber triblock copolymer.

13. The method as in claim 5 wherein the blending occurs at a temperature of from about 175°–350° C.

14. The method as in claim 5 wherein said nucleophilic polymer is polyamide-66.

15. A composition comprising a copolymer formed by the reaction of polyphenylene ether-graftorthoester with a nucleophilic polymer.

16. A composition as in claim 15 wherein said nucleophilic polymer is selected form the group consisting of polyesters, polyamides, and functionalized polyolefins.

17. A composition as in claim 15 wherein said polyester is polyethylene terephthalate or polybutylene terephthalate.

18. A composition as in claim 15 wherein said polyamide is polyamide-66.

19. A method as in claim 1 wherein said polyphenylene ether is 2,6-dimethyl-1,4-polyphenylene ether.

20. A composition as in claim 15 wherein said polyphenylene ether-graft-orthoester is made from 2,6-dimethyl-1,4-polyphenylene ether and 4-acryloyloxymethyl-2-methoxy-2-methyl-1,3-dioxolane.

* * * * *